(12) United States Patent
Liu et al.

(10) Patent No.: US 9,373,017 B2
(45) Date of Patent: Jun. 21, 2016

(54) SCANNING SYSTEM

(71) Applicant: Datalogic Automation, Inc., Telford, PA (US)

(72) Inventors: Xinping Liu, Doylestown, PA (US); Edward I Chaleff, Doylestown, PA (US)

(73) Assignee: Datalogic Automation, Inc., Telford, PA (US)

( * ) Notice: Subject to any disclaimer, the term of this patent is extended or adjusted under 35 U.S.C. 154(b) by 362 days.

(21) Appl. No.: 13/872,045

(22) Filed: Apr. 26, 2013

(65) Prior Publication Data

US 2014/0319219 A1    Oct. 30, 2014

(51) Int. Cl.
*G06K 7/10*    (2006.01)

(52) U.S. Cl.
CPC ........ *G06K 7/10831* (2013.01); *G06K 7/10702* (2013.01); *G06K 7/10792* (2013.01)

(58) Field of Classification Search
CPC . G06K 7/10; G06K 7/10702; G06K 7/10792; G06K 7/10821; G06K 7/10831; G06K 7/10594; G06K 7/10544; G01B 11/00; G01B 11/04
USPC .................................. 235/454, 455, 462.01
See application file for complete search history.

(56) References Cited

U.S. PATENT DOCUMENTS

| | | | |
|---|---|---|---|
| 3,813,140 A | 5/1974 | Knockeart | |
| 5,661,561 A | 8/1997 | Wurz et al. | |
| 5,900,611 A * | 5/1999 | Hecht | G06K 7/10861 235/454 |
| 5,969,823 A | 10/1999 | Wurz et al. | |
| 6,056,198 A | 5/2000 | Rudeen et al. | |
| 6,177,999 B1 | 1/2001 | Wurz et al. | |
| 6,775,012 B2 | 8/2004 | Wurz et al. | |
| 6,808,155 B2 | 10/2004 | Anthony | |
| 8,360,318 B2 | 1/2013 | Reynolds et al. | |
| 2008/0035390 A1* | 2/2008 | Wurz | 177/25.15 |
| 2011/0315770 A1 | 12/2011 | Patel et al. | |

FOREIGN PATENT DOCUMENTS

| | | |
|---|---|---|
| DE | 19936440 | 3/2001 |
| EP | 0926615 | 5/2001 |

OTHER PUBLICATIONS

Fenimore, E.E. and Cannon, T.M., "Coded Aperture Imaging with Uniformly Redundant Arrays," Applied Optics, Feb. 1, 1978, vol. 17, No. 3, pp. 337-347.

Horstmeyer, Roarke, Oh, Se Baek, and Raskar, Ramesh, "Iterative Aperture Mask Design in Phase Space Using a Rank Constraint," Optics Express, Oct. 11, 2010, vol. 18, No. 21, pp. 22545-22555.

(Continued)

*Primary Examiner* — Laura Gudorf
(74) *Attorney, Agent, or Firm* — Nelson Mullins Riley & Scarborough, LLP

(57) ABSTRACT

A scanning system has a collimated light source and a movable reflective surface. The surface receives light from the light source, reflects the received light to a target surface, receives light reflected from the target surface, and reflects this light to a detector. An aperture disposed between the reflective surface and the target surface has a non-transmissive portion with a width in a direction perpendicular to the laser scan direction that varies over the scan direction.

14 Claims, 7 Drawing Sheets

(56) References Cited

OTHER PUBLICATIONS

Skinner, Gerald K., "The Sensitivity of Coded Mask Telescopes," Dec. 30, 2007, Optical Society of America, pp. 1-10.

International Search Report and Written Opinion dated Aug. 8, 2014, for corresponding International Application No. PCT/US2014/035259.

* cited by examiner

SCANNING SYSTEM

FIELD OF THE INVENTION

The present invention relates to scanning systems.

BACKGROUND OF THE INVENTION

Various devices and systems are known that utilize scanning systems. For example, referring to FIG. 1, a known dimensioning system 10 includes a conveyor system 12 that moves items along a path of travel, and a component system 14 adjacent to the conveyor system that tracks packages being moved by the conveyor system. Conveyor system 12 includes a number of rollers 16, a belt 24, a bed 18 and a tachometer 20. It should be understood that the conveyor can move the items through the path of travel by means other than belts, for example by driven rollers. Rollers 16 are motor-driven rollers that move conveyor belt 24 in a direction denoted by arrows 26 over bed 18, which provides support to the belt. For purposes of the present discussion, the direction corresponding to the start of conveyor system 12 is referred to as "upstream," whereas the direction in which conveyor belt 24 moves is referred to as "downstream."

Tachometer 20 is beneath and in contact with the surface of conveyor belt 24 and rotates with the belt as the belt moves in the direction of arrows 26. As tachometer 20 rotates, it outputs a signal comprising of a series of pulses corresponding to the conveyor belt's linear movement and speed. Tachometer 20, and other devices that provide signals corresponding to the rate of movement of a conveyor belt, from which the locations of items moving in a path of travel along the belt can be determined, as should be understood by those of ordinary skill in the art. In general, the number of pulses output by tachometer 20 corresponds to the linear distance traveled by the belt, while pulse frequency corresponds to the belt's speed. The number of tachometer pulses per unit of measurement defines the tachometer's resolution and its ability to precisely measure the distance that the conveyor belt has moved. Tachometer 20 may be replaced by a shaft encoder, particularly where less accurate measurements are needed.

Component system 14 includes a dimensioner 28, a plurality of barcode scanners 32, and optionally a separate system computer 36, all of which are attached to a frame 38. Frame 38 supports dimensioner 28 and at least one barcode scanner 32 horizontally above conveyor belt 24 so that beams of light emitted by the dimensioner and scanners intersect the top surfaces of packages moved by the belt. Frame 38 also supports additional scanners 32 vertically adjacent to conveyor belt 24 so that beams of light emitted by these scanners intersect the side, back, front or bottom surfaces of packages moved by the belt. Examples of prior art laser scanner barcode readers include the DS_series, DX8200A, AXIOM and AL5010 barcode readers manufactured by formerly Accu-Sort Systems, Inc. and Datalogic Automation, Inc. of Telford, Pa., although it should be understood that camera-type barcode readers, for example the AV6010 barcode reader manufactured by Datalogic Automation, Inc., or other suitable barcode readers could be used, depending on the needs of a given system.

As should be understood in this art, dimensioner 28 detects one or more dimensions of an item on a conveyor. In a system designed to track singulated packages (i.e. packages carried by the conveyor so that they do not overlap in the direction of travel, and are thus easily distinguishable by a photodetector with a direction of vision in the x direction) the dimensioner is disposed along the conveyor at a known position relative to the bar code readers and a photoeye. When a package moving along the conveyor reaches the photoeye, the photoeye outputs a signal to the dimensioner. The dimensioner also receives tachometer data and therefore knows the tachometer count that occurred when the package was detected at the photoeye. The dimensioner opens a package record and associates the tachometer count corresponding to the photoeye event. The dimensioner also knows the distance (in tachometer pulses) between the photoeye and the dimensioner. Thus, when a package reaches the dimensioner, the dimensioner reads the present tachometer count, subtracts the predetermined distance back to the photoeye, and checks the existing package records for the record having that resulting tachometer count. The dimensioner determines the package's height, width and length, and associates that data in the package record. Alternatively, the photoeye data may be received by separate computer 36, instead of the dimensioner. In such an embodiment, the dimensioner creates an individual package record when a package reaches the dimensioner, determines the package's height, width, and length, associates the dimension data and the tachometer count with the package record, and outputs the dimension data to system computer 36 which, in turn, associates the dimension data with the correct photoeye record.

The barcode reader also receives the photoeye signal and also knows the distance from the photoeye to its scan line. As does the dimensioner, the barcode reader opens a package record upon receiving a photoeye signal indicating presence of a package, and associates the corresponding tachometer value with that record. When a package reaches the reader's scan line, the reader backs the photoeye/reader distance from the present tachometer value, identifies the package record that corresponds to the resulting value, and associates barcode data from the package with the selected record. As should be understood in this art, barcode reader 32 may comprise a laser scanner that projects a plurality of laser lines on the belt, for example in a series of "X" patterns, that the reader utilizes to detect and read barcodes. The barcode processor accumulates barcode data while a given package passes through the X patterns and stores the accumulated barcode data to the package record. More specifically, the barcode scanner processor knows the package length based on the original photoeye data, and so knows, following the point when the leading edge reached the reader's scan line, when the following edge passes. Thus, the reader can store in the record all barcode data detected therebetween.

Each of the dimensioner and the barcode readers know the system transmit point, which is defined in terms of distance, or tachometer pulses, from the photoeye to a point sufficiently downstream of all dimensioners and readers that the trailing edge of the largest package the system is expected to carry will have cleared all tunnel devices by the time the package's leading edge reaches the transmit point. As noted above, all of the dimensioner and the readers track all packages passing the photoeye, Each device accumulates information in a respective package record as the package moves through the tunnel, and each device monitors the tachometer data following creation of each package record. When, following the creation of a package record, the dimensioner and readers determine that a number of tachometer pulses corresponding to the distance between the photoeye and the transmit point have passed, each of these devices outputs its package record to the host system.

As should be understood, however, dimensioners and scan-type barcode readers are utilized in systems other than singulated scanning tunnels. For instance, such devices may be used in non-singulated tunnels, in which packages may overlap in the direction of the belt's travel. Such systems may omit the photoeye, in that packages are not tracked through the system, but on the other hand such systems may utilize sophisticated dimensioning and barcode location algorithms, for example for purposes of determining compliance with size restrictions or identifying items passing through checkpoints. For purposes of the present disclosure, the use of a dimensioner or a scanning type system in other types of devices is not limited to singulated tracking systems and may be used outside of conveyor systems.

The system described with respect to FIG. 1 includes barcode scanners that project an X-pattern across the belt. It should be understood by those skilled in the art that X-pattern scanners can be replaced with line scan readers for detecting and reading barcodes, or with camera-type readers.

In the system shown in FIG. 1, dimensioner 28 may be of a type as disclosed in U.S. Pat. Nos. 6,775,012, 6,177,999, 5,969,823, and 5,661,561, the entire disclosures of which are incorporated by reference herein. With regard to such dimensioners, dimensioner 28 comprises a light source, such as a laser, and a rotating reflector disposed within the dimensioner housing that produce a scanning beam (denoted in phantom at 40) that is directed down at conveyor belt 24. That is, the rotating reflector scans the single point light source across the width of belt 24. Each angular position of the reflector represents an x-axis location across the belt. Scanning beam 40 intersects belt 24 at line 42 in a manner that is transverse (x-axis 80) to the belt's linear movement (y-axis 82) in the path of travel at a fixed angle with respect to an axis normal (z-axis 84) to the belt's surface. Packages moving on belt 24, such as package 62, intersect scanning beam 40, thereby creating an offset in the scanning beam in the y-direction (along y-axis 82). In particular, the laser light source is positioned downstream in the y-axis 82 direction so that the plane of light is reflected at an angle from z-axis 84. Thus, as a box moves downstream the intersection of the plane of light is a continuous line across the belt in along x-axis 80. When a box intersects the plane of light, the portion of the plane intersected by the box shifts forward toward the light source (in the y direction) since the light on the box travels a shorter distance than the light that intersects the belt on the left and right sides of the box. This offset or shift in the light on the box surface is proportional to the height of the box.

Both conveyor belt 24 and the packages thereon reflect light created by the scanning beam back to the rotating mirror, which reflects light to a linear array of line scan CCD detectors or a CMOS imager (not shown) within dimensioner 28. The array is oriented parallel to y-axis 82. Because the rotating mirror reflects both the outgoing and reflected laser light, the mirror returns the reflected light to a constant x-axis position, but the reflected light shifts in the y-direction correspondingly to the shift in line 42 caused by the height of a package 62 and the angle at which the scanned laser beam intersects the belt. Thus, the linear array of CCD or CMOS detectors should be accurately aligned in the y-direction to thereby detect the return light's y-axis shift. Moreover, because the array is made up of a single line of pixel sensors, the alignment should be properly aligned to detect the reflected light. The rotating mirror's angular position corresponds to the x-axis position of any given point of reflected light.

In a still further arrangement, a mirrored wheel-type scanning dimensioner may direct a laser scan pattern 40 down to the belt in a vertical plane, parallel to the z axis. As a mirror facet on the wheel sweeps a laser beam across the target surface, that same facet receives the light reflected from the target and reflects this return light back into the dimensioner optics. As long as the beam sweeps across an area of constant height, the return beam reflected from the facet to the detector through the optics remains in a constant position. If the target height changes, however, the return light shifts in the x direction. The amount of the shift depends on the angle between the z axis and the axis of the laser beam (or of the returned light), and there is no shift when the beam is directly vertical. This, in turn, causes a linear shift in the return light directed to the detector, which can be correlated to height above the belt given knowledge of the wheel's angular position when the shift occurs.

Dimensioner 28 generates a signal representative of the height of an object such as package 62 across conveyor belt 24 as described by the y-axis or, depending on the type of dimensioner, x-axis offset detected in scanning beam 40. The signal is also representative of the x-axis positions of the height data by association of that data with the mirror's angular position. Based on the height data and corresponding x-axis data, the dimensioner processor (not shown) determines the cross sectional height profile of an object on the belt and, by accumulating such profiles along the object's length, the object's three dimensional profile.

Still further, a dimensioner may be configured as described in U.S. Pat. No. 8,360,318, the entire disclosure of which is incorporated by reference herein, in which a laser projects a light pattern from the dimensioner with an optical axis directed downward in the x-z plane, and at an angle theta with respect to the z axis. As illustrated in and described with respect to FIG. 19 of the '318 patent, a pair of such lasers may be provided, to prevent shadowing, if desired. The laser devices may project a pattern of sequential light and dark bars or dots, or combination of such or other geometric shapes, across the belt in the x direction. The linear sensor is also aligned in the x direction, i.e. transverse to the belt's direction of movement, so that the sensor detects the reflected light pattern. Due to the laser light's projection at angle theta, when an object passes into the laser device(s) field(s) of view, the pattern detected by the sensor shifts in the x direction.

The dimensioner generates a signal representative of the item's height, extending across conveyor belt 24 over the item's width, as described by the x-axis offset detected in the scanning beam. The signal is also representative of the x-axis positions of the height data by identification of the portion of the pattern that shifts, given the otherwise known position of the shifted portion in the overall pattern, as described in U.S. '318. Based on the height data and corresponding x-axis data, the dimensioner processor determines the cross sectional height profile an object on the belt and, by accumulating such profiles along the object's length, the object's three dimensional profile.

SUMMARY

The present invention recognizes and addresses the foregoing considerations, and others, of prior art constructions and methods.

One or more of these and/or other objects may be achieved in an embodiment of a scanning system within a scanning tunnel having a frame and a conveyor structure. The conveyor structure has a generally planar surface and is moveable with respect to the frame in a direction of travel. The scanning system is in a position with respect to the frame that is fixed during movement of the conveyor structure in the direction of travel. The scanning system has a laser light source, a rotatable, multi-faceted wheel, and an aperture. The wheel is disposed with respect to the laser light source and the conveyor structure so that when the wheel rotates, and a facet receives light from the laser light source, the facet reflects the light to the conveyor structure in a scan across the conveyor structure in a direction transverse to the direction of travel, receives light reflected from the conveyor structure and objects carried by the conveyor structure, and reflects the reflected light to a detector. The aperture is disposed between the wheel and the conveyor structure so that light from the laser light source that is reflected from the conveyor structure and the objects to the facet passes through the aperture. The aperture has a first area that receives and transmits to the facet light from the laser light source that is reflected from the conveyor structure and the objects. The aperture has a second area that receives and blocks or diffuses light from the laser light source that is reflected from the conveyor structure and the objects. The second area has a total width in a direction perpendicular to the transverse direction that varies over the transverse direction.

In a further embodiment of the present invention, a scanning system has a source of collimated light, a moveable reflective surface, and an aperture. The reflective surface is movably disposed with respect to the source of collimated light so that when the reflective surface moves, and receives light from the source of collimated light, the reflective surface reflects the light to a target surface in a scan across the target surface in a first direction, receives light reflected from the target surface, and reflects the reflected light to a detector. The aperture is disposed between the reflective surface and the conveyor structure so that light from the source of collimated light that is reflected from the target surface to the reflective surface passes through the aperture. The aperture has a first area that receives and transmits to the reflective surface light from the source of collimated light that is reflected from the target surface, and a second area that receives and blocks or diffuses light from the source of collimated light that is reflected from the target surface. The second area has a total width in a second direction that is perpendicular to the first direction and that varies over the first direction.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
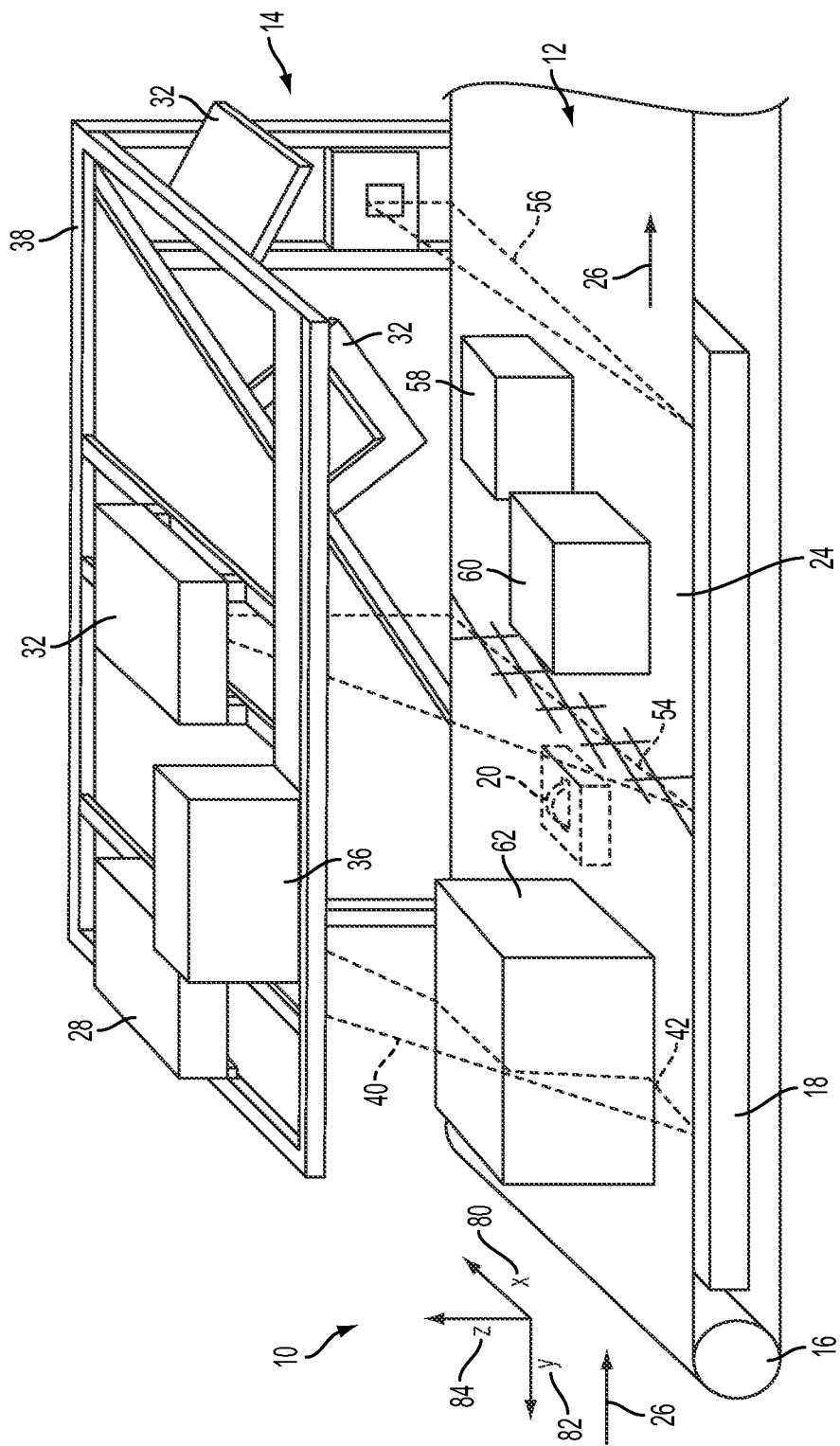
FIG. 1 is a schematic illustration of a prior art dimensioning and barcode reading system.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

Figure 2:
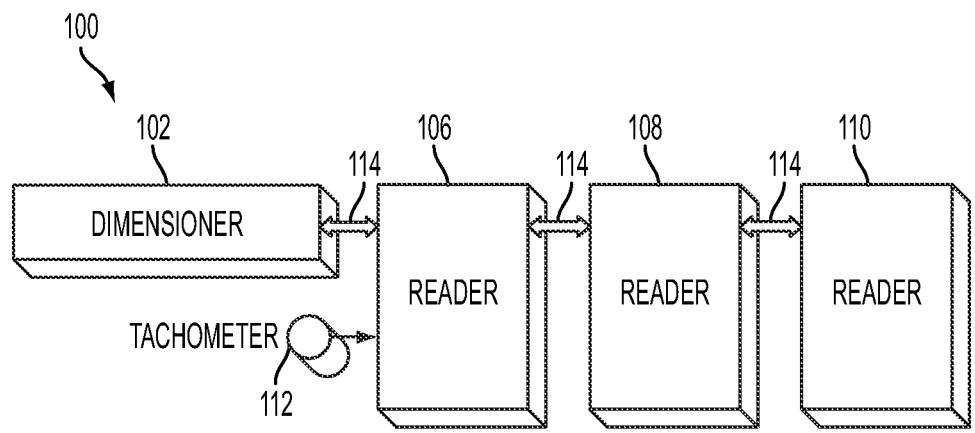
FIG. 2 is a block diagram of a dimensioning system in accordance with an embodiment of the present invention.

Referring to FIG. 2, a dynamic dimensioning system 100 generally comprises a dimensioner 102 for determining the height and rough dimensions of a box being transported on a conveyor, multiple barcode readers 106, 108, 110 and a tachometer 112 connected to at least one reader 106 that outputs a signal representative of the conveyor belt's movement. The dimensioner and the readers are networked together by, for example, an Ethernet connection 114. While only three readers are shown in FIG. 2, it should be understood that any number of readers can be networked together to form a scanning tunnel. One of skill in the art should understand that Ethernet is a local-area network (LAN) architecture that uses a bus or star topology and supports data transfer rates of 10 Mbps. Ethernet uses the CSMA/CD access method or other LAN standard to handle simultaneous demands. A version of Ethernet, called 100Base-T (or Fast Ethernet), supports data transfer rates of 100 Mbps, and Gigabit Ethernet supports data rates of 1 gigabit (1,000 megabits) per second.

Figure 3:
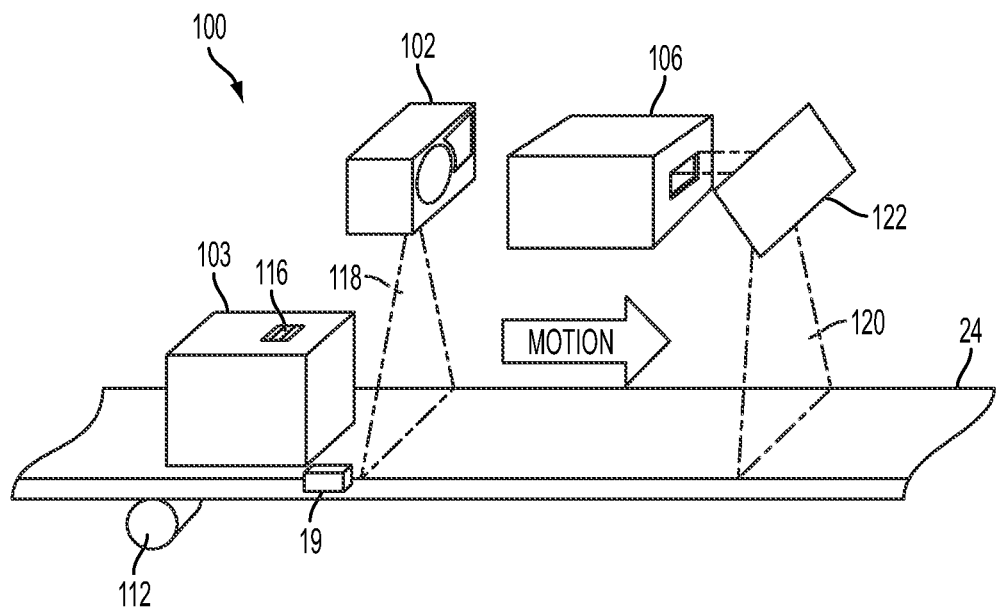
FIG. 3 is a schematic illustration of a portion of the dimensioning system of FIG. 2.

Referring to FIG. 3, dynamic dimensioning system 100 is a singulated conveyor tracking system that scans objects, such as object 103, moving on a conveyor structure, for example a belt 24, decodes indicia, such as barcodes 116, located on the object and transmits the information to a host system (not shown) for further processing. Shown in the figure is a top read barcode reader 106 and dimensioner 102 in accordance with one embodiment of the present invention. In general, objects are moved through a field of view 118 of dimensioner 102. Dimensioner 102 detects the presence of object 103 and determines the range, extent and orientation of the object with respect to the conveyor belt. The extents of an object refer to the left and right edges of the object along x-axis 80. The dimensioner and the reader receive data from photoeye 19, create package records, and accumulate information in association with those records, in the manner as discussed above with regard to FIG. 1. Although scanning-type readers are discussed herein for use with the system as in FIG. 3, it will be understood that camera-type readers could also be used, and in that event, dimensioner 102 may transmit height and extent data to a camera-type reader 106, which uses the information to focus its optics to maximize the efficiency and effectiveness of detecting and reading barcode 116.

It should be understood, moreover, that the arrangement shown in FIG. 2 is provided for purposes of example only and in particular that a dimensioner such as shown at 102 may be used in various environments for various purposes. For instance, a dimensioner may be used in a non-singulated system, or may be used in a non-conveyor system as a standalone device.

Referring again to FIGS. 2 and 3, each reader 106, 108 and 110 processes the data and locates and decodes any barcode data present on the object by detecting light reflected from the object being scanned. Once the object reaches a predetermined transmit point downstream from the tunnel system (this point is set by the host), the dimensioner and the readers transmit the barcode data to the host system for further processing. It should be understood that reader 106 may be mounted to direct its field of view 120 directly onto conveyor 24, or the field of view may be redirected by a mirror 122 as shown in FIG. 3. Redirect of the field of view allows the reader to be positioned so that its scanning image is parallel to y-axis 82, where mirror 122 redirects the field of view along z-axis 84.

Each of dimensioner 102 and barcode readers 106, 108, and 110 may be comprised of a laser scanning device having a mirrored wheel that reflects a laser beam toward the conveyor belt and, as the wheel turns, repeatedly sweeps the beam to form a scan line across the belt. The discussion below provides an example described in the context of a laser scanner arrangement having a laser scan field aligned vertically (e.g. in the z direction in a system such as in FIG. 1), the reflected light from which does not normally shift in the y direction during use. As noted above, however, it should be understood that other scanner structures are well known, for example as described in U.S. Pat. No. 6,775,012, in which scanner laser light is projected across a target object, such as an object on a conveyor belt, in the z-direction but at an angle with respect to the z-axis, such that shifts occurs in the y direction when the laser scan pattern intercepts the target object. The scanning system has a linear detector so that the reflected light shifts in its area of incidence on the linear sensor in accordance with the y-direction shift caused by the package's interference with the laser scan pattern, so that height can be determined from this characteristic of the reflected light. While the vertically-aligned laser scan pattern is presumed, it should be understood that the discussion below is also applicable to scanners that operate with angled scan fields.

Moreover, while the present discussion is provided in the context of dimensioners and barcode readers, it should be understood that the present invention may be embodied in other devices utilizing moveable scan surfaces, and that the discussion of dimensioners and barcode readers is provided herein for purposes of example and not limitation. Further, for example, while the example scanning systems described herein employ a faceted rotating wheel to sweep the scan line, it should be understood that a scan line may be produced by moveable reflective surfaces, e.g. oscillating mirrors, other than a rotating wheel. Still further, while a laser light source is described, it should be understood that other sources of light, such as high-power light emitting diodes, may be used.

Figure 4:
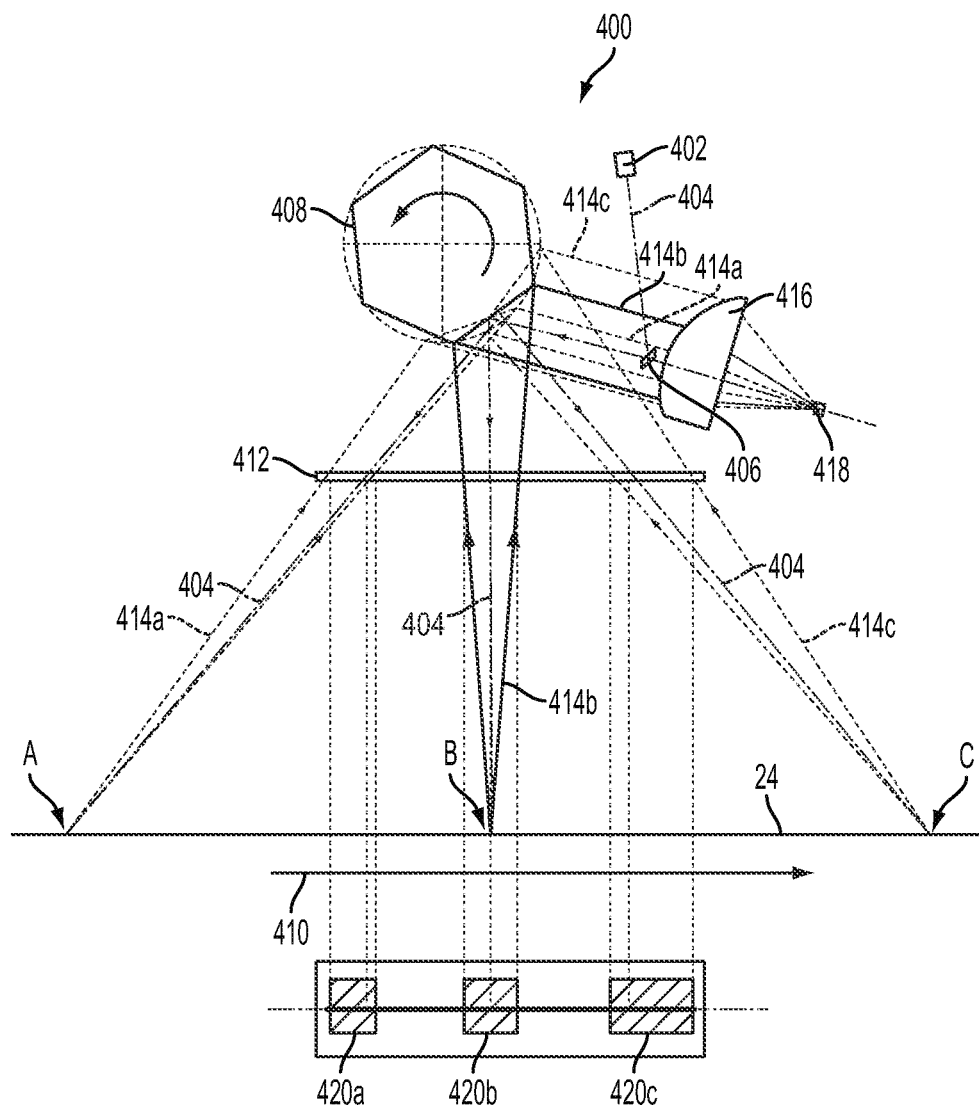
FIG. 4 is a schematic illustration of a scanning system that may be used in a dimensioner or barcode reader system as in FIG. 2.

Referring to FIG. 4, the scanning system 400 may be comprised of a laser and lens assembly mounted in the housing of devices 102, 106, 108 and 110. The laser assembly includes a laser diode 402 that produces a coherent, collimated (and, possibly, modulated) beam 404 that is directed, via a folding mirror 406, toward a six-sided, multi-faceted mirrored wheel 408. The mirrored wheel is driven by a motor (not shown) so that the wheel moves beam 404 as the beam reflects from the turning wheel's mirrored facets. As the wheel turns, the point on a given facet at which laser beam 404 meets and reflects from the facet moves across the facet surface, sweeping the reflected beam generally transverse to belt 24, as indicated by arrow 410. Thus, while FIG. 4 illustrates three positions of beam 404 as it extends between wheel 408 and belt 24, it should be understood that the reflected beam 404 sweeps continuously across the belt in the direction of arrow 410 as beam 404 traverses a given facet. When the beam reaches the end of one facet as the wheel turns, the beam moves to the next facet, thereby starting the sweep cycle anew.

Figure 6:
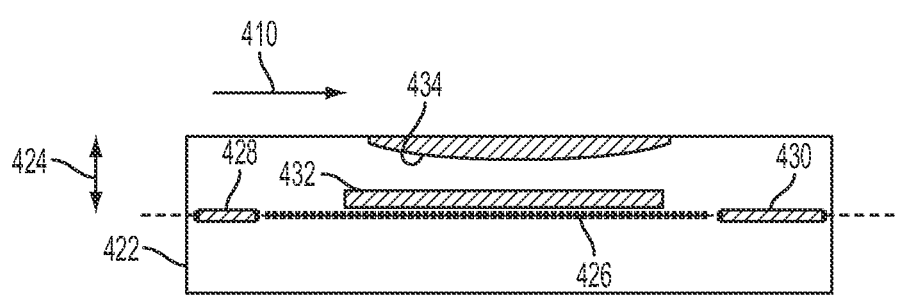
FIG. 6 is a top plan view of a coded aperture for use in a scanning system as in FIG. 5.

Although not shown in FIG. 4, laser system 400 is enclosed within a housing that generally does not transmit laser light therethrough. The housing defines an aperture, however, in which is disposed an exit window 412 of laser-transparent material. The length of exit window 412, in the direction 410 of the scan line sweep, is at least sufficient to allow beam 404 to fully traverse a desired scanning surface such as a conveyor belt, as described above. Because laser beam 404 is, in essence, a point source of light, the width of exit window 412 in the direction 424 (FIG. 6) transverse (and in this instance, perpendicular) to direction 410 (i.e., into and out of the page from the perspective of FIG. 4) need not be large in order to permit the laser beam's transmission. However, light 414, reflected back from the belt from incident laser beam 404, has a greater two-dimensional cross section in the plane defined by directions 424 and 410. Accordingly, the transverse width of window 412 (i.e. in the direction 424, as shown in FIG. 6) should be sufficient to allow passage of that light reflected from belt 24 desired to be directed to detector 418. In one preferred embodiment, the width of window 412 in direction 424 is at least the width of the facets of wheel 410 in direction 424, given that the facet dimensions define the area that collects reflected light. In general, however, the particular dimensions of a given exit window 412 depend upon the configuration and needs of a given scanning system.

The portion of light 414 that reflects from belt 24 toward wheel 408 in turn reflects off a facet of the rotating wheel. As indicated in FIG. 4, rotating wheel 408 reflects this light to a lens 416 that focuses the reflected light to a point detector 418, typically a photodiode, phototransistor, photomultiplier, or the like or, where the scanner is a triangulation-type device, a linear detector such as a linear charge coupled device.

As is apparent in FIG. 4, light 414b reflected from the belt in the center region of the laser scan travels a shorter distance to detector 418 than does the light (414a or 414c) reflected from the belt edges. As should be well understood, the reflected light's intensity is inversely proportional to the distance the light travels. Thus, light reflected from the center of the scan, i.e. at near focal distances, is measurably stronger than light reflected from the belt edges, i.e. at far focal distances. This effect is still further evident for light signals reflected, e.g., from the center position from a relatively tall object, even when compared to reflected light from a lower-height object at the same center point.

As should also be understood, it is preferable in the scanner's operation to have a high signal-to-noise ratio (SNR), and for that reason, it is known to apply a gain to the detected signal. This magnifies the effects of the light intensity difference between signals resulting from the near and far focal distances, however, and gain sufficient to achieve a desired SNR at the far focal distances can risk driving the detector's electronics into saturation at the near focal distances. Thus, the dynamic range of detector 418 and its associated electronics can limit the gain that can be applied to the detected signal, thereby limiting SNR at the far focal distances.

Although it is possible to resolve this problem by increasing the dynamic range of sensor 418, such increased capability increases cost of the sensor and related electronics. An alternative approach described in U.S. Pat. No. 6,056,198, the entire disclosure of which is incorporated by reference herein, provides a mask between the collection lens and the detector. In general, the mask defines a laser-transmissive area (or, if a non-laser source is used, an area transmissive to such light) at its center, with non-transparent or diffusing areas (generally included within the term "non-transmissive areas") beyond or to the sides. At the near focal distances, the reflected light from the object is focused by the collection lens at a point behind the detector, thus widening the cross-section of the focused cone of light at the detector's plane. The dimensions of the light-transmissive center area are such that substantially all of the desired reflected light from the far focal distances is focused through the center area. Light from the near focal distance, however, widens into the non-transmissive area due to the shift in the point of focus. The blocked or diffused light does not reach the detector, thereby limiting the amount of light transmitted to the detector at the near focal distances.

The structure described in the '198 patent is effective in accommodating variation in intensity of light between near and far focal distances, but it does not accommodate intensity differences that can occur between light from far focal distances originating from different points in a scan. For instance, and referring again to FIG. 4, it will be understood that laser light 404 reaching belt 24 reflects from the belt in all directions. FIG. 4, however, illustrates reflected light 414a, 414b, and 414c only as beams having respective angular widths encompassing the amount of the light that reflects to a facet of wheel 408 that reflects the light to optics 416, and thence to detector 418. The angular orientation of the facet's planar surface with respect to the reflected light 414, which can be considered in terms of the angle between the planar facet surface and a center axis of a given reflected light beam 414a-414c, determines the angular width of the reflected light beam, and therefore the amount of reflected light, that the wheel facet in turn reflects to lens 416 and detector 418. The angle between the planar facet surface and the reflected light axis is smallest at the laser scan's left-most position, as shown in FIG. 4, increasing through the center position and reaching a maximum at the right-most position. The change in angular width leading from left to right is indicated by the widths (in direction 410) of beams 414a, 414b, and 414c as they pass through the exit window. As indicated at 420a, 420b and 420c, the reflected beam width increases as the scan moves in direction 410 from left to right. If the distance traveled by the reflected light were to remain constant, the light intensity level difference would occur smoothly from left to right. Because distance does change, however, and because the inverse square law makes the intensity differential more responsive to distance changes than to angular changes, the distance effect dominates. Nonetheless, angular changes do contribute to the intensity differential problem.

The structure described in the '198 patent does not compensate for intensity differences caused by angular changes between the reflected beam and the wheel facet, except involving very near distances, because the change in light intensity caused by angular changes is independent of focal distance. As is apparent from FIG. 4, the light reflected from wheel 408 to focusing lens 416 increases in width (in the plane of the page of FIG. 4) as the beam sweeps from left to right. But this increase in width does not cause any variation in the signal collected from left to right, especially at far distances, because the focus point does not drift on the photodetector surface. Thus, as long as light is focused at a small spot on the photodetector, there is no effect due to the scan line's left-to-right movement. On the other hand, at near distances, if a too-small aperture is placed on the photodetector, the non-transmissive area outside the opening tends to block more light from the side than from the center position, thus worsening performance. Moreover, placing a mask close to the photodetector requires high precision in assembly.

Figure 5:
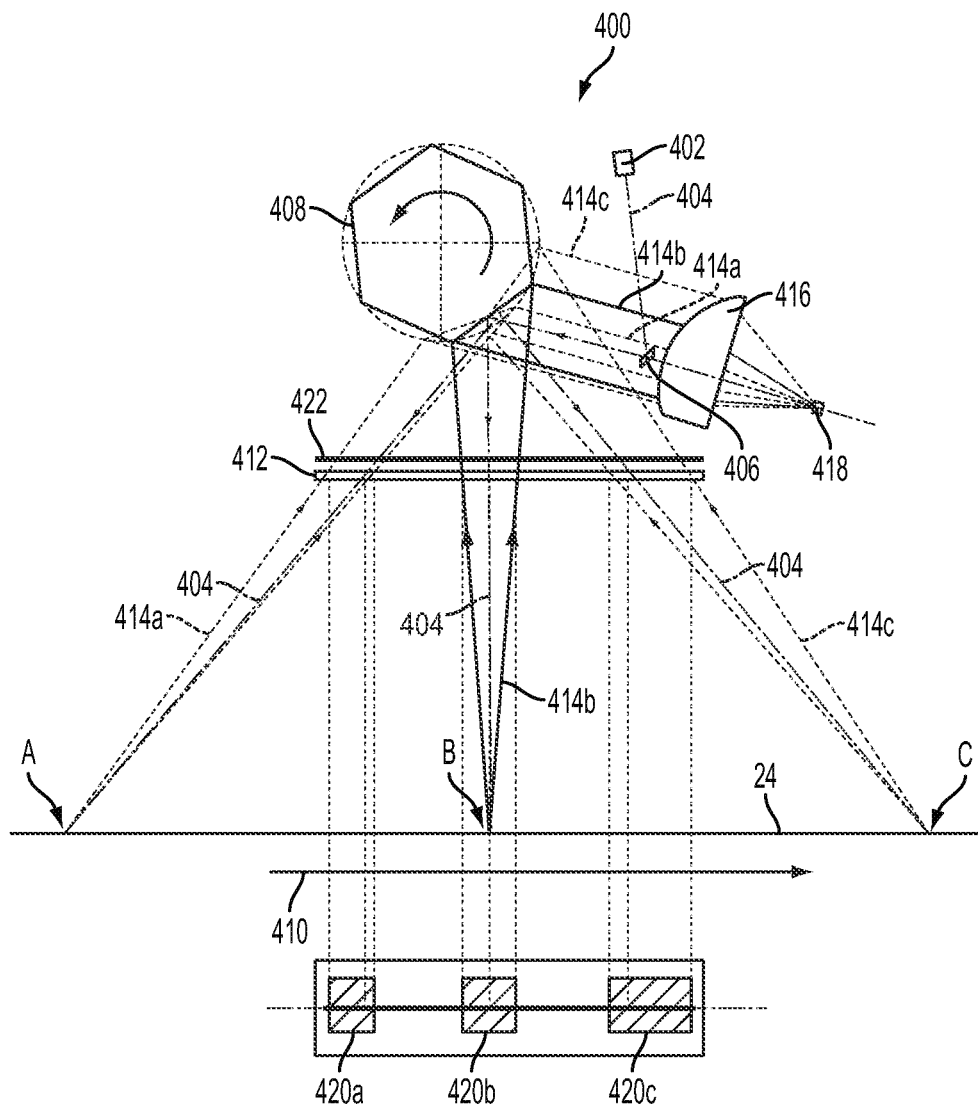
FIG. 5 is a schematic illustration of a scanning system in accordance with an embodiment of the present invention.

In order to address both the distance and angular causes of reflected light intensity differential, and referring to FIG. 5, an embodiment of the present invention places a coded aperture layer 422 between rotating wheel 408 and belt 24, rather than between the wheel and the detector. Although coded aperture 422 is illustrated in FIG. 5 between wheel 408 and exit window 412, it should be understood that this is for purposes of explanation only. The coded aperture could be disposed between the exit window and the belt or could be incorporated into the exit window itself. Thus, the presently-described embodiment should be understood to be presented for purposes of explanation and not for limitation.

Referring also to FIG. 6, which illustrates a top view of coded aperture 422, it should be understood that the coded aperture has a length in direction 410 sufficient to encompass the full sweep of the scan light in that direction. Its width in direction 424, transverse to direction 410, is sufficient to allow passage of a desired amount of reflected light in those areas in which all reflected light is transmitted without obstruction. As should be understood, such dimensions will be a function of the design of a given scanning device. The unshaded areas of coded aperture 422 are made of a laser-transmissive material, e.g. optical glass, float glass, quartz, sapphire or other materials such as high optimal-quality plastics, as should be understood. Given such dimensions in transverse direction 424, however, coded aperture 422 defines areas that block or diffuse the transmission of reflected light through the coded aperture. These non-transmissive areas may be made from an opaque material with a low reflective factor, such as black metal or black opaque plastic. The particular examples shown in FIG. 6 include blocking or diffusing portions that serve distinct functions.

Note, first, a line 426 that extends through the center of coded aperture 422 in direction 410 represents the path of outgoing laser scan line 404 (FIG. 4). A region of interest within the laser scan may be defined within the laser scan pattern's angular width, and may be considered to be the range of outgoing light 404 that will traverse an area from which it is possible to reflect desired information. In other words, any outgoing laser light 404 outside the region of interest will necessarily reflect from an area that is expected to contain no desired information. Thus, coded aperture 422 defines left and right blocking areas 428 and 430 in the path of the outgoing scan line so as to block or diffuse outgoing laser light 404 that is outside the region of interest. This prevents such light from reflecting from non-informative surfaces back through the center of the aperture, from which the undesirable light could be reflected to detector 418.

Figure 7:
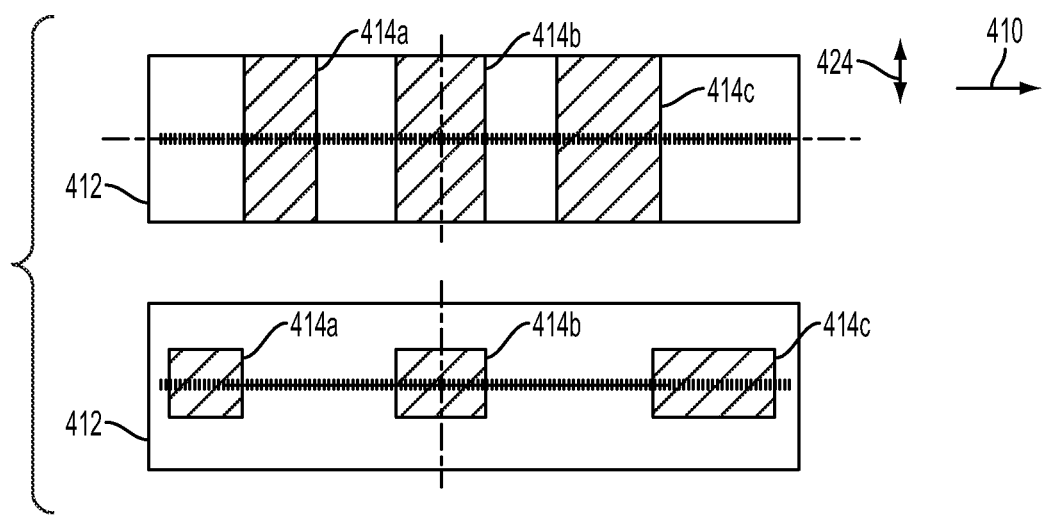
FIG. 7 is a schematic illustration of collected reflected light within scanning systems as in FIGS. 4 and 5.

A center non-transmissive portion 432 has a constant width in direction 424 and is centered within the laser scan's angular sweep. Thus, this portion blocks (due to its proximity to the outgoing scan line, it preferably blocks rather than diffuses) a portion of the reflected light over a center angle of the laser scan and therefore serves primarily to alleviate the intensity differential contributed by the distance increase at the scan center. The working principle of non-transmissive area 432 can be illustrated with reference to FIG. 7, which illustrates two examples of the cross section of exit window 412, with the shaded areas indicating the areas through which reflected beams 414a, 414b, and 414c pass, modified based on the effects of coded aperture 422. The bottom illustration in FIG. 7 describes light collection for light reflected from a relatively tall package on the belt, i.e. a near reflection, whereas the top illustration in FIG. 7 describes light collection for light reflected from a relatively short package on the belt, i.e. a far reflection.

Non-transmissive portion 432 blocks, in absolute terms, the same amount of light at all distances, but in terms of percentage, it blocks more light reflected from close distances than from far distances, because for light reflected from close distances, the useful collection width is about half the window width (in direction 424). This occurs because the detector's width itself acts as a further limiting "aperture." Selection of a sensor size for detector 418 that collects all or effectively all light at far distances but excludes light at near distances resulting from expansion of the light cone as discussed above, has an effect similar to putting a mask about the detector, as described in the '198 patent (although it should be understood that the coded aperture described herein can be used in conjunction with a mask as described in the '198 patent as well), and in another embodiment, the sensor is selected for such dimensions. This allows the system to take advantage of the procedure described in the '198 patent while avoiding the cost and assembly issues noted above and to improve balance in the mid-to-near focal distances.

Figure 8:
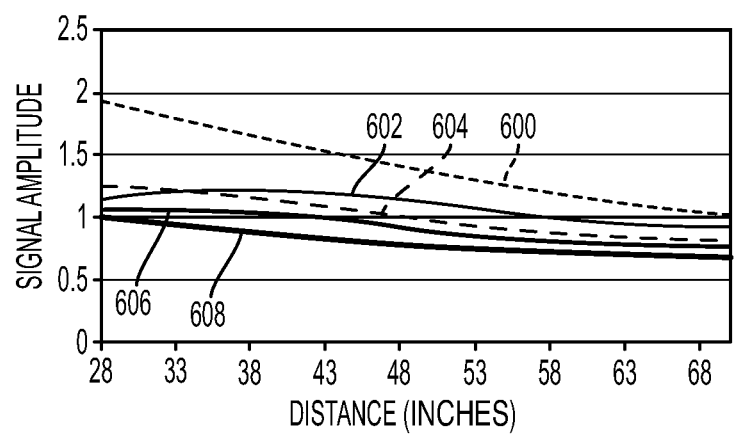
FIG. 8 is a graphical illustration of collected reflected light within scanning systems as in FIGS. 4 and 5.

A third non-transmissive portion 434 has a width in direction 424 that varies as the scan moves in direction 410. The width of region 434 in direction 424 reaches a maximum at the center of the laser scan sweep. Thus, considering the total blocking or diffusing area, within the region of interest (i.e., the combination of portions 432 and 434), as a function of direction 424, the width, and therefore the non-transmissive effect, is at a maximum at the center of the laser scan sweep, i.e. at the point in the sweep at which the light path distance between belt 24 and detector 418 is shortest and the intensity differential problem greatest, and decreases before and after this point. Note that because portion 432 does not extend to either the right or left ends of the aperture, it allows greater transmission at the ends, thus effectively improving contribution at the ends of the scan from a balancing stand point. The decrease in width of the combination of portions 432 and 434, considered in direction 424, to either side of the center of the laser scan in direction 410, accommodates for the decreasing intensity differential problem in those parts of the scan that are farther from the center. However, the rate at which the width of the blocking or diffusing portions in direction 424 decreases is higher where moving from the center toward the left than when moving from the center toward the right. This is due to the effect on intensity differential made by the angle between the wheel facet and the reflected light. Because more light is reflected from the right side of sweep than from the left, the total non-transmissive area in direction 424 decreases at a lower rate in coded aperture 422 moving from the center toward the right. The total area of the non-transmissive portions, and the rate at which this area's width in direction 424 changes as a function of direction 410, is configured to maintain the intensity of the light reflected back to detector 418 (FIG. 4) at as constant a level as possible. Ideally, the reflected light intensity is constant throughout the entire laser scan, thereby allowing a greater gain to be applied to the detected signal within a given dynamic range of the detector, and thereby increasing signal-to-noise ratio. This, in turn, allows the scanning system to effectively operate at a greater range. FIG. 8, for instance, illustrates signal amplitude for leftmost, center, and rightmost reflected beams (i.e. beams 414a, 414b, and 414c, in FIGS. 4 and 5) as a function of measured distances at those positions, and with (FIG. 5) and without (FIG. 4) coded aperture mask 422. The horizontal axis describes distance measurements indicated by the reflected signal. The vertical axis describes amplitude. Line 600 describes the amplitude of reflected light 414b from the center position, without coded aperture 422 (i.e. from beam 414b, FIG. 4). Line 602 describes the amplitude of reflected light 414b with coded aperture 422 (i.e. from beam 414b, FIG. 5). Line 604 describes the amplitude of reflected light 414c from the right position, without coded aperture 422 (i.e. from beam 414c, FIG. 4). Line 606 describes the amplitude of reflected light 414c with coded aperture 422 (i.e. from beam 414c, FIG. 5). Line 600 describes the amplitude of reflected light 414b from the center position, without coded aperture 422 (i.e. from beam 414b, FIG. 4). Since the coded aperture has no non-transmissive portion on the left side, line 608 describes the amplitude of reflected for light 414a, both with and without coded aperture 422.

Iterative methods of making coded optical masks should be well understood. Given the present disclosure to vary the collected light intensity as function of the scan sweep direction (direction 410) to account for intensity differential arising from distance variation and/or angular variation, and the desire to increase the evenness of intensity distribution for received signals across a scan in order to maximize the ability to apply gain to the detector signal to increase range and SNR, one skilled in the art should understand methods to iteratively create coded apertures to implement such effects. Using known optical optimization tools, a coded aperture can be designed to optimize the shape and position of the non-transmissive areas based on the distance (in the z direction) over which the scanner system is intended to operate, the required width (i.e. angular width or x-direction distance at the maximum z distance) of scan coverage, the dimensions of the light coverage (i.e. the amount of light collected through the optics), and the detector size. Thus, the particular methods and algorithms for creating the coded apertures themselves should be understood and are therefore not discussed in further detail herein.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:
1. A scanning tunnel comprising:
a frame;
a conveyor structure having a generally planar surface and being moveable with respect to the frame in a direction of travel; and
a scanning system in a position with respect to the frame that is fixed during movement of the conveyor structure in the direction of travel, wherein the scanning system comprises
a laser light source,
a rotatable, multi-faceted wheel disposed with respect to the laser light source and the conveyor structure so that when the wheel rotates, and a facet receives light from the laser light source, the facet
reflects the light to the conveyor structure in a scan across the conveyor structure in a direction transverse to the direction of travel, receives light reflected from the conveyor structure and objects carried by the conveyor structure, and reflects the reflected light to a detector, and an aperture that is disposed between the wheel and the conveyor structure so that light from the laser light source that is reflected from the conveyor structure and the objects to the facet passes through the aperture, the aperture having a first area that receives and transmits to the facet light from the laser light source that is reflected from the conveyor structure and the objects, and a second area that receives and blocks or diffuses light from the laser light source that is reflected from the conveyor structure and the objects, wherein the second area has a total width in a direction perpendicular to the transverse direction that varies over the transverse direction, the second area comprises a first portion and a second portion, the first portion has a width in the direction perpendicular to the transverse direction that does not vary over the transverse direction, and the second portion has a width in the direction perpendicular to the transverse direction that varies over the transverse direction.

2. A scanning system comprising:
a source of collimated light;
a reflective surface movably disposed with respect to the source of collimated light so that when the reflective surface moves, and receives light from the source of collimated light, the reflective surface reflects the light toward a target surface in a scan across the target surface in a first direction, receives light reflected from the target surface, and reflects the reflected light to a detector; and an aperture that is disposed between the reflective surface and the target surface so that light from the source of collimated light that is reflected from the target surface to the reflective surface passes through the aperture, the aperture having a first area that receives and transmits to the reflective surface light from the collimated light source that is reflected from the target surface, and a second area that receives and blocks or diffuses light from the source of collimated light that is reflected from the target surface, wherein the second area has a total width in a second direction perpendicular to the first direction that varies over the first direction, the second area comprises a first portion and a second portion, the first portion has a width in the second direction that does not vary over the first direction, and the second portion has a width in the second direction that varies over the first direction.

3. The scanning system as in claim 2, wherein the source of collimated light is a laser light source.

4. The scanning tunnel as in claim 1, wherein the aperture is disposed between the wheel and the conveyor structure so that light from the laser light source that is reflected from the facet to the conveyor structure passes through the aperture, and wherein the aperture defines a portion of the first area at which the aperture receives the light reflected from the facet so that the scan traverses at least a predetermined width of the conveyor structure.

5. The scanning tunnel as in claim 4, wherein the first portion is adjacent the portion of the first area at which the aperture receives the light reflected from the facet.

6. The scanning tunnel as in claim 1, wherein a rate at which the total width of the second area varies over the transverse direction on one side of a center of the scan is different than a rate at which the total width of the second area varies over the transverse direction on an opposing side of the center.

7. The scanning tunnel as in claim 1, wherein the first portion is disposed in the aperture so that the first portion blocks or diffuses light reflected from a center portion of the predetermined width of the conveyor structure.

8. The scanning tunnel as in claim 7, wherein the first portion has a length in the transverse direction so that the first portion does not block or diffuse light reflected from respective portions of the predetermined width of the conveyor structure on opposite ends of the center portion.

9. The scanning tunnel as in claim 1, wherein the detector defines a width over which the detector collects light reflected from the facet, and wherein the width over which the detector collects light is predetermined to exclude a portion of light reflected from the facet that is received by the facet from the conveyor structure within a predetermined distance from the facet.

10. The scanning system as in claim 2, wherein the aperture is disposed between the reflective surface and the target surface so that light from the source of collimated light that is reflected from the reflective surface to the target surface passes through the aperture.

11. The scanning system as in claim 2, wherein the first portion is adjacent a portion of the first area that receives the collimated light reflected from the reflective surface.

12. The scanning system as in claim 2, wherein a rate at which the total width of the second area varies over the first direction on one side of a center of the scan is different than a rate at which the total width of the second area varies over the first direction on an opposing side of the center.

13. A scanning tunnel comprising:
a frame;
a conveyor structure having a generally planar surface and being moveable with respect to the frame in a direction of travel; and
a scanning system in a position with respect to the frame that is fixed during movement of the conveyor structure in the direction of travel, wherein the scanning system comprises a laser light source, a rotatable, multi-faceted wheel disposed with respect to the laser light source and the conveyor structure so that when the wheel rotates, and a facet receives light from the laser light source, the facet reflects the light toward the conveyor structure in a scan across the conveyor structure in a direction transverse to the direction of travel, receives light reflected from the conveyor structure and objects carried by the conveyor structure, and reflects the reflected light to a detector, and an aperture that is disposed between the wheel and the conveyor structure so that light reflected from the facet toward the conveyor structure, and light from the laser light source that is reflected from the conveyor structure and the objects to the facet, pass through the aperture, the aperture having a first area that receives and transmits to the facet light from the laser light source that is reflected from the conveyor structure and the objects, wherein a portion of the first area receives the light reflected from the facet toward the conveyor structure, and a second area that receives and blocks or diffuses light from the laser light source that is reflected from the conveyor structure and the objects, wherein the second area has a total width in a direction perpendicular to the transverse direction that varies over the transverse direction, and wherein the second area is located in the aperture asymmetrically with respect to the portion of the first area that receives the light reflected from the facet toward the conveyor structure.

14. A scanning system comprising:

a source of collimated light;

a reflective surface movably disposed with respect to the source of collimated light so that when the reflective surface moves, and receives light from the source of collimated light, the reflective surface reflects the light toward a target surface in a scan across the target surface in a first direction, receives light reflected from the target surface, and reflects the reflected light to a detector; and an aperture that is disposed between the reflective surface and the target surface so that light from the source of collimated light that is reflected from the target surface to the reflective surface passes through the aperture, the aperture having a first area that receives and transmits to the reflective surface light from the collimated light source that is reflected from the target surface, wherein a portion of the first area receives the light reflected from the reflective surface to the target structure, and a second area that receives and blocks or diffuses light from the source of collimated light that is reflected from the target surface, wherein the second area has a total width in a second direction perpendicular to the first direction that varies over the first direction, and wherein the second area defines an edge thereof adjacent to the portion of the first area that extends parallel to the portion of the first area over a center portion of the scan.

* * * * *